May 14, 1968
L. K. TUCKER
3,382,746
COMBINATION TOOLHOLDER
Filed May 4, 1966
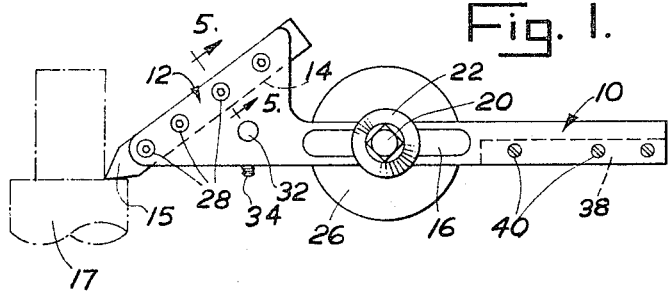
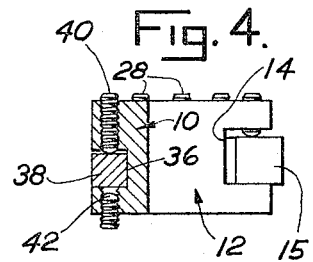
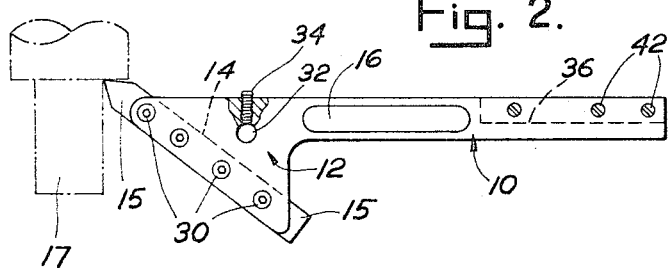
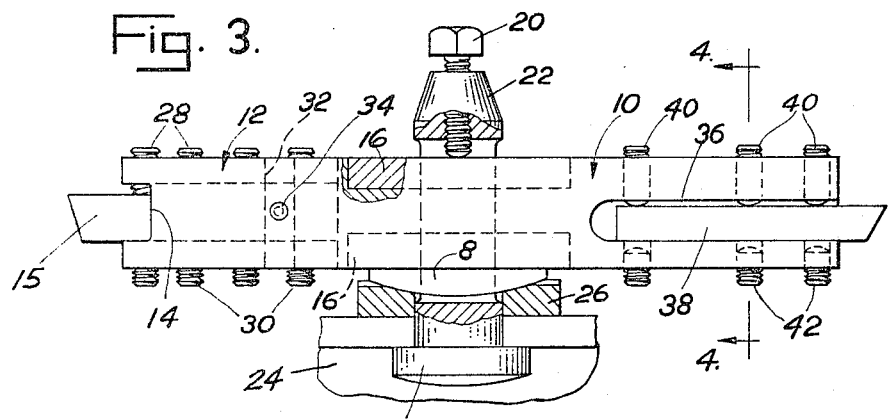
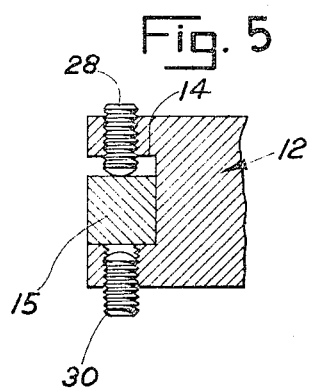
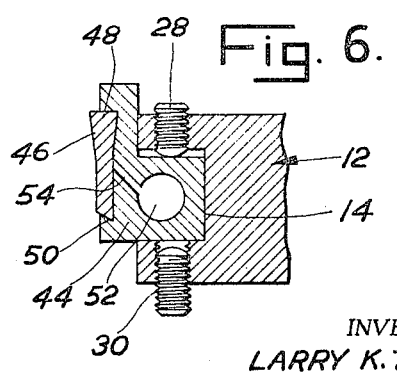
INVENTOR
*LARRY K. TUCKER*
BY *Bair, Freeman*
*& Molinare* ATTORNEYS United States Patent Office
3,382,746
Patented May 14, 1968

3,382,746
COMBINATION TOOLHOLDER
Larry K. Tucker, 604 Park Ave.,
Sycamore, Ill. 60178
Filed May 4, 1966, Ser. No. 547,487
3 Claims. (Cl. 82—36)

This invention relates to a combination toolholder for lathe tool bits and the like which is reversible in such a way that a tool bit held therein may be used for either right hand or left hand cuts whereby a single toolholder of my design may be used for either cut instead of having to provide a right hand toolholder and a left hand toolholder, thereby effecting an economy in the purchase of toolholders for lathe operations.

One object of the invention is to provide a toolholder which comprises a shank and a head that is at an angle relative to the shank, the shank and head being reversible top for bottom whereby in one instance the lathe tool bit held thereby is presented for right hand cuts and in the other instance for left hand cuts.

Another object is to provide a novel set screw arrangement for a tool bit receiving groove of my toolholder which permits the tool bit to be held therein for either right hand or left hand cuts even though the shank and head are turned over, and comprises two sets of set screws to enter the tool bit receiving groove from opposite sides thereof whereby in either position of the toolholder, that set of set screws can be used to clamp the bit in the holder which is opposite to the direction of rotation of the work.

Still another object is to provide the shank with hardened inserts for clamping engagement of the clamping means of a tool post thereagainst.

A further object is to provide the end of the shank opposite the head with a groove in the side thereof to receive a tool bit, means being provided to retain such tool bit therein and also comprising two sets of set screws.

Still a further object is to provide the latter groove adapted to receive a cut-off tool bit holder which has a bit receiving groove of variable width and wherein the set screw means serves to reduce this width to thereby rigidly clamp the cut-off tool bit holder against the edges of the cut-off tool bit.

An additional object is to provide the shank of the tool with a vertical hole therein to receive a supporting rod of an indicator, a set screw being provided to retain such rod in the vertical hole.

With these and other objects in view, my invention consists in the construction, arrangement and combination of the various parts of my combination toolholder, whereby the objects above contemplated are attained, as herienafter more fully set forth, pointed out in my claims and illustrated in detail on the accompanying drawing, wherein:

FIG. 1 is a plan view of my combination toolholder mounted in a tool post and having a lathe tool bit therein, the parts being positioned for a right hand cut;

FIG. 2 is a similar plan view of the combination toolholder and the bit turned over in relation to FIG. 1 for left hand turning;

FIG. 3 is an enlarged side elevation of FIG. 1 showing my combination toolholder mounted in a regulation tool post shown partly in section;

FIG. 4 is a vertical sectional view on the line 4—4 of FIG. 3 and shows a tool bit mounted in a groove of the shank opposite the head of the tool holder;

FIG. 5 is an enlarged sectional view on the line 5—5 of FIG. 1; and

FIG. 6 is an enlarged sectional view similar to a portion of FIG. 4 showing a cut-off tool bit holder and a cut-off tool bit in the shank groove of my combination toolholder.

On the accompanying drawing I have used the reference numeral 10 to indicate in general a shank and 12 a head of my toolholder. The head 12 has a tool bit receiving groove 14 therein at an angle relative to the shank 10 as shown in FIGS. 1 and 2, and the angle may be reversed by merely turning the tool over as illustrated in these two figures.

The shank 10 is provided with a pair of hardened inserts 16 with which a key 18 and a set screw 20 of a regulation tool post 22 may coact, the inserts thereby taking the clamping pressure and providing a long-lasting toolholder as shown in FIG. 3, the tool post being mounted in the T groove of a cross slide 24 in the usual manner, and a seat washer 26 being shown for the key 18.

FIGS. 1 and 5 show a tool bit 15 held in the groove 14 by set screws means. The groove 14 is symmetrical with respect to the top and bottom surfaces of the shank 10 and head 12 as shown in FIG. 5 and I provide two sets of set screws 28 and 30 opposite each other extending into the sides of the groove. Accordingly, the set screws 30 can be backed off sufficiently for the bottom of the tool bit 15 to rest against the lower side of the groove 14 as shown in FIG. 5 while the set screws 28 are tightened down to hold the tool bit in engagement therewith. My combination toolholder as shown in FIG. 1 can accordingly be used for turning a right hand shoulder on the work such as a shaft 17 shown by dot-and-dash lines.

If a left hand shoulder is to be turned, my combination toolholder is turned over, the set screws 28 are loosened for removal of the tool bit 15 and the tool bit is turned over and mounted in the groove 14 to again seat against the lower side of the groove. The set screws 30 are then tightened down against the tool bit. Obviously, therefore, the single combination toolholder which I provide takes the place of a pair of former toolholders, one right hand and one left hand.

I provide a vertical hole 32 in the head 12 to receive a supporting rod of an indicator, and a set screw 34 for tightening against the rod to hold the indicator in position. Accordingly, my combination toolholder is useful as a mounting means for an indicator such as one of the dial type or one which consists merely of a rod having an indicating end positioned adjacent the work to show the degree off center as the work is rotated by the lathe.

I provide a second tool bit receiving groove 36 in the shank 10 at the end thereof opposite the head 12 to receive a tool bit 38 extending longitudinally of the shank for straight turning as distinguished from right hand or left hand turning. The shank is provided with first and second sets of set screws 40 and 42 to be used in the same way as the sets of set screws 28 and 30 already described. It will be noted the groove 36 is off-center so that the tool bit 38 may be located slightly lower than a centered position as shown in FIG. 3, or if the shank 10 is turned over it will be located slightly higher than a centered position, an advantage for certain types of tool bits.

My combination toolholder is illustrated as also including a cut-off tool bit holder 44 shown in FIG. 6 in which a blade type cut-off tool bit 46 is mounted. A shoulder 48 and a dovetail shoulder 50 are provided to coact with the upper and lower edges of the bit 46, and to clamp against those edges when the set screws 28 are tightened down. For this purpose an axial hole 52 extends throughout the length of the holder 44, which length may be approximately that of the head 12, and a slot 54 permits drawing of the shoulders 48 and 50 toward each other as the set screws are tightened. This type of cut-off tool bit holder is adaptable for either right or left hand mounting, FIG. 6 showing it for right hand mounting. For left hand mounting the holder and bit would be turned end for end when the shank 10 is turned over as in FIG. 2. The type of cut-off tool bit and holder disclosed eliminates any side clamping nuts or bolt heads and can therefore work close to a shoulder on the work.

From the foregoing specification it will be obvious that I have provided a combination toolholder which accomplishes the objects contemplated and is adaptable for a number of uses which heretofore required several different toolholders.

Some changes may be made in the construction and arrangement of the parts of my combination tool holder without departing from the real spirit and purpose of my invention, and it is my intention to cover by my claims any modified forms of structure or use of mechanical equivalents which may reasonably be included within their scope.

I claim as my invention:

1. In a combination toolholder, a shank adapted to be clamped in a tool post, a head on said shank having a tool bit receiving groove in the side thereof, said groove being at an angle relative to said shank and being symmetrically located relative to the top and bottom surfaces of said shank whereby the shank may be clamped in a tool post with either side up and the angle of said tool bit receiving groove thereby reversed for either right hand or left hand cuts by a tool bit received in said groove, and means to retain the tool bit in said groove comprising two sets of set screws to enter said groove from opposite sides thereof whereby, in either position of said toolholder, that set of set screws which is opposite to the direction of rotation of the work can be used to hold the tool bit and the other set can be backed off from the tool bit, and wherein the end of said shank opposite said head is provided with a groove in the side thereof to receive a tool bit, and means is provided to retain such tool bit therein comprising two sets of set screws to enter said last mentioned groove from opposite sides thereof whereby in either position of said toolholder that set of set screws can be used which is opposite to the direction of rotation of the work.

2. In a combination toolholder, a shank adapted to be clamped in a tool post, a head on said shank having a tool bit receiving groove in the side thereof, said groove being at an angle relative to said shank and being symmetrically located relative to the top and bottom surfaces of said shank whereby the shank may be clamped in a tool post with either side up and the angle of said tool bit receiving groove thereby reversed for either right hand or left hand cuts by a tool bit received in said groove, and means to retain the tool bit in said groove comprising two sets of set screws to enter said groove from opposite sides thereof whereby, in either position of said toolholder, that set of set screws which is opposite to the direction of rotation of the work can be used to hold the tool bit and the other set can be backed off from the tool bit, and wherein the end of said shank opposite said head is provided with a groove in the side thereof to receive a tool bit, a cut-off bit holder is received in said last mentioned groove and has a cut-off tool bit receiving groove of variable width to receive a cut-off tool bit, and set screw means to engage said cut-off tool bit holder and decrease its width to thereby clamp a cut-off tool bit in said cut-off tool bit receiving groove and thereby in said cut-off tool bit holder.

3. A combination toolholder in accordance with claim 1 wherein said head has a vertical hole therein to receive a supporting rod of an indicator, and a set screw is provided to retain such supporting rod in said vertical hole.

References Cited

UNITED STATES PATENTS

| 1,415,379 | 5/1922 | Martin | 29—96 |
|---|---|---|---|
| 2,475,049 | 7/1949 | Premo | 82—36 |
| 2,571,530 | 10/1951 | Brekke | 82—36 |

FOREIGN PATENTS 691,572  7/1930  France.

LEONIDAS VLACHOS, *Primary Examiner.*